(12) United States Patent
Hiner et al.

(10) Patent No.: US 9,435,260 B2
(45) Date of Patent: Sep. 6, 2016

(54) METHOD AND SYSTEM FOR TESTING FILTER ELEMENT PERFORMANCE

(71) Applicant: BHA Altair, LLC, Franklin, TN (US)

(72) Inventors: Stephen David Hiner, Salisbury (GB); Bradly Aaron Kippel, Greenville, SC (US); Paul Sherwood Bryant, Amesbury (GB); Giorgio Marchetti, Ancona (IT); Philippe Claudon, Etueffont (FR)

(73) Assignee: BHA Altair, LLC, Franklin, TN (US)

( * ) Notice: Subject to any disclaimer, the term of this patent is extended or adjusted under 35 U.S.C. 154(b) by 439 days.

(21) Appl. No.: 14/099,249

(22) Filed: Dec. 6, 2013

(65) Prior Publication Data

US 2015/0159603 A1 Jun. 11, 2015

(51) Int. Cl.
*G01N 15/08* (2006.01)
*F02C 7/052* (2006.01)

(52) U.S. Cl.
CPC ............ *F02C 7/052* (2013.01); *B01D 2273/18* (2013.01); *F05D 2260/83* (2013.01)

(58) Field of Classification Search
CPC ....................................................... F02C 7/052
USPC ............................................................. 73/38
See application file for complete search history.

(56) References Cited

U.S. PATENT DOCUMENTS

| 4,158,449 A | 6/1979 | Sun et al. |
|---|---|---|
| 8,163,072 B2 | 4/2012 | Kippel et al. |
| 8,479,754 B2 | 7/2013 | Hjerpe |
| 2010/0050873 A1 | 3/2010 | Hiner et al. |
| 2014/0202235 A1* | 7/2014 | Nicholas ............ G01N 15/0826 73/38 |
| 2015/0113938 A1* | 4/2015 | Kippel ...................... F02C 7/05 60/39.092 |

FOREIGN PATENT DOCUMENTS

WO 2012034971 A1 3/2012

* cited by examiner

*Primary Examiner* — Clayton E Laballe
*Assistant Examiner* — Dennis Hancock
(74) *Attorney, Agent, or Firm* — Reinhart Boerner Van Deuren P.C.

(57) ABSTRACT

A system for testing at least one air filter element is provided. The system includes a test rig, wherein the test rig includes an elongated duct, and at least one measurement device coupled to the duct. The at least one measurement device is configured to measure at least one characteristic representative of a condition within the duct. At least one air filter element is coupled within the test rig. At least one first salt spray test is performed on the at least one air filter element. The collected salt spray water and equivalent amount of dry salt remaining in the test rig are quantified. At least one second salt spray test is performed on the at least one air filter element, wherein the at least one air filter element is dust loaded prior to the at least one second salt spray test.

15 Claims, 6 Drawing Sheets

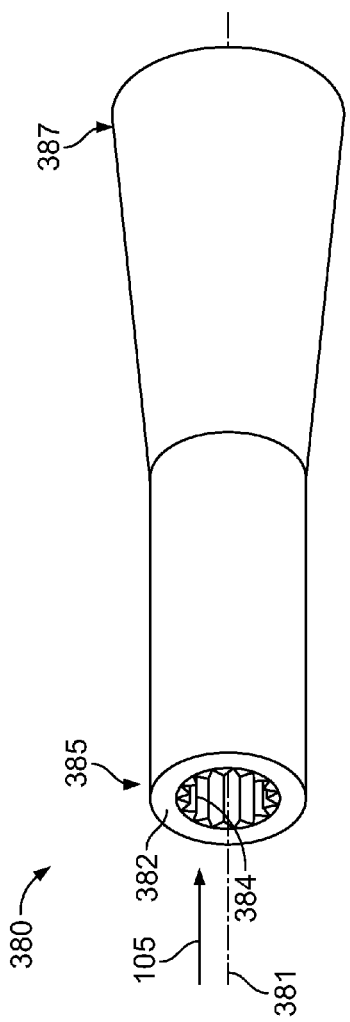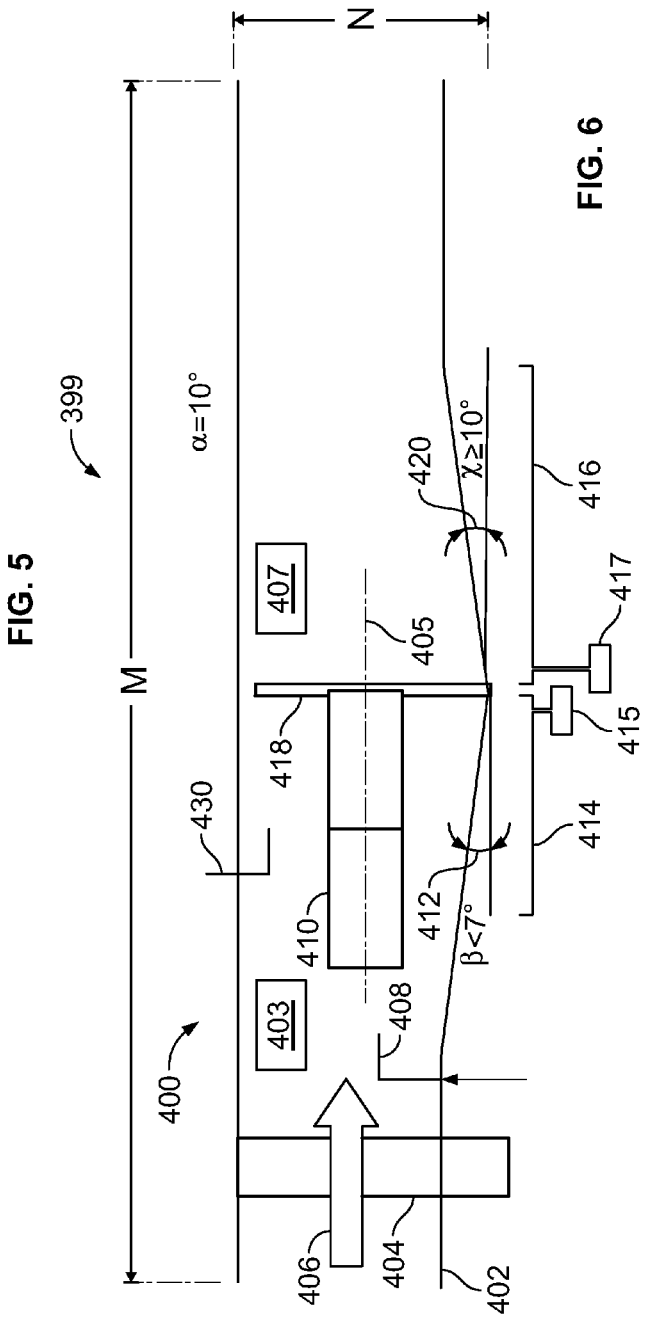

METHOD AND SYSTEM FOR TESTING FILTER ELEMENT PERFORMANCE

BACKGROUND

The present disclosure relates generally to gas turbine engine air intake systems and, more specifically, to methods and systems for testing filter element performance for gas turbine engine air intake systems.

At least some known gas turbine engines for power generation include systems for filtration of ambient intake air used for combustion in the gas turbine engine. At least some known filtration systems include several different types of filter element elements, such as, but not limited to, moisture separators, coalescing filter element elements, and self-cleaning filter element elements. At least some known gas turbine engine air intake systems make use of filter element elements that are supplied by a variety of entities. In order to ensure a consistent predetermined level of performance for the filter element elements supplied for use in such air intake systems, industry standards may be established that set forth objectively measurable criteria that each type of filter element must adhere to. Such standards may include particular criteria that are established to address specific conditions under which the particular type of filter element being tested will be expected to operate.

For example, at least some known gas turbine engine systems include air intake systems that are exposed to environments, such as coastal environments, that may present challenging atmospheric air conditions, including, but not limited to, heavy fog and/or other high humidity conditions, salt spray, and dust or other particulate matter. At least some known gas turbine engine systems used in such conditions include static air filtration systems. For such static air filtration systems, standards exist for testing individual system components. However, standards are not known to exist for testing a static air filtration system as a whole, and under as-installed operating conditions, particularly in operating conditions that include exposure to conditions in coastal environments. In addition, at least some gas turbine engine systems include water-tight self-cleaning filter element elements used for water removal applications, for which qualification testing methods are needed.

BRIEF DESCRIPTION

In one aspect, a method for testing at least one air filter element. The method includes providing a test rig, wherein the test rig includes an elongated duct that has a bottom wall and a top wall, and at least one measurement device coupled to the duct. The at least one measurement device is configured to measure at least one characteristic representative of a condition within the duct. The method includes coupling at least one air filter element within the test rig. The method also includes performing at least one first salt spray test on the at least one air filter element. The method also includes quantifying at least one of an amount of salt spray water and an equivalent amount of dry salt remaining in the test rig. The method also includes performing at least one second salt spray test on the at least one air filter element, wherein the at least one air filter element is dust loaded prior to the at least one second salt spray test.

In another aspect, a system for testing at least one air filter element is provided. The system includes a test rig. The test rig includes an elongated duct. A salt water spray source is coupled to the elongated duct. An air flow source is coupled to an upstream end of the elongated duct. At least one measurement device is also coupled to the elongated duct, wherein the at least one measurement device is configured to measure at least one characteristic representative of a condition within the duct. The system also includes at least one air filter element configured in the elongated duct downstream from the salt water spray source and the air flow source.

BRIEF DESCRIPTION OF THE DRAWINGS

FIG. 5 is a perspective view of an exemplary self-cleaning filtration element for use in the gas turbine system shown in FIG. 1.

FIG. 6 is a schematic illustration of an exemplary test rig for use in testing the self-cleaning filtration element shown in FIG. 5.

DETAILED DESCRIPTION

Figure 1:
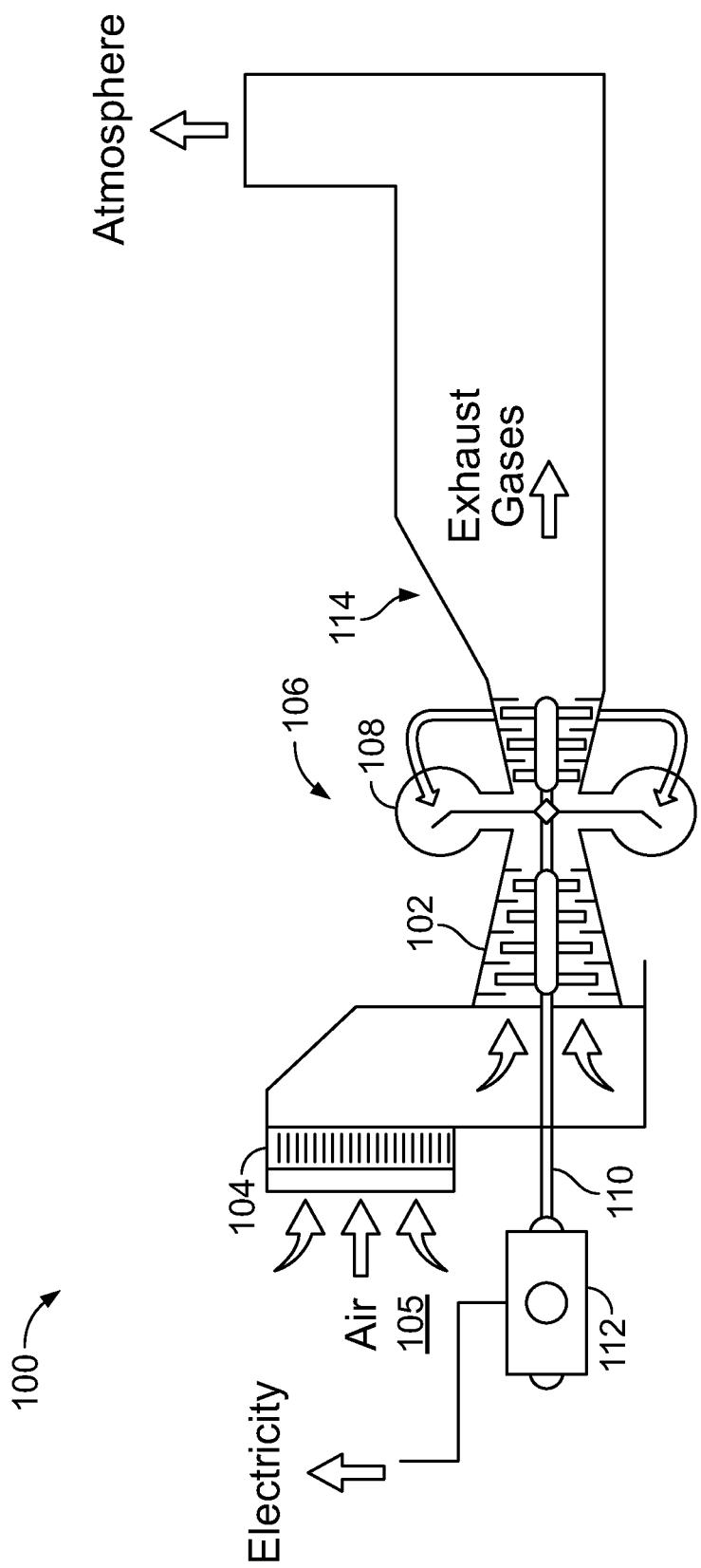
FIG. 1 is a block diagram of an exemplary gas turbine system.

FIG. 1 is a simplified schematic diagram of a gas turbine system 100. In the exemplary embodiment, gas turbine system 100 includes a compressor 102 including an air intake system 104 that receives air 105. Compressor 102 is coupled to a gas turbine engine 106 that includes one or more combustion chambers 108. Compressor 102 compresses air 105 received via air intake system 104 and channels the compressed air into combustion chambers 108, wherein the compressed air is mixed with fuel and ignited to supply gas turbine engine 106 with hot combustion gases for driving a first shaft 110. First shaft 110 is coupled to a first generator 112, and causes first generator 112 to generate electricity. Moreover, gas turbine engine 106 discharges exhaust gases into an exhaust duct 114.

Figure 2:
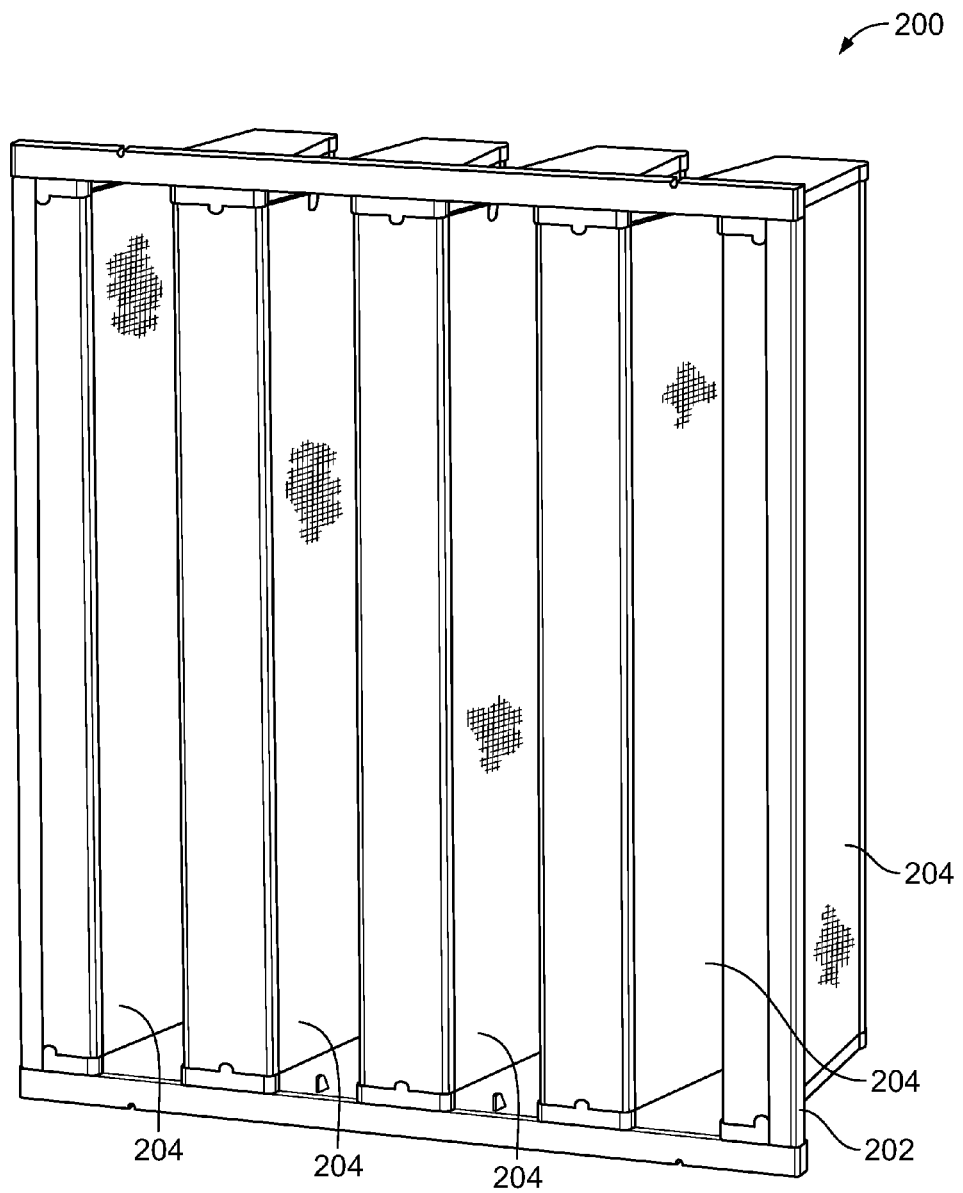
FIG. 2 is a perspective view of an exemplary static filtration element for use in the gas turbine system shown in FIG. 1.

FIG. 2 is an elevational view of an exemplary static air filter element 200 for use in air intake system 104 (shown in FIG. 1). Filter element 200 includes a frame 202 that supports filter element media 204. A gasket structure (not shown) is coupled to frame 202 to provide a sealed connection between filter element 200 and a housing (not shown) that supports filter element 200 when in use. In the exemplary embodiment, filter element media 204 are fabricated from a filtration material configured to intercept a portion of at least one of a plurality of contaminant materials, including but not limited to, water droplets, salt particles, and/or dust particles, from a flow of intake air 105 (shown in FIG. 1). In the exemplary embodiment, each of frame 202, filter element media 204, and the gasket may have any suitable configuration and may be fabricated from any suitable material that enables filter element 200 to function as described herein.

Figure 3:
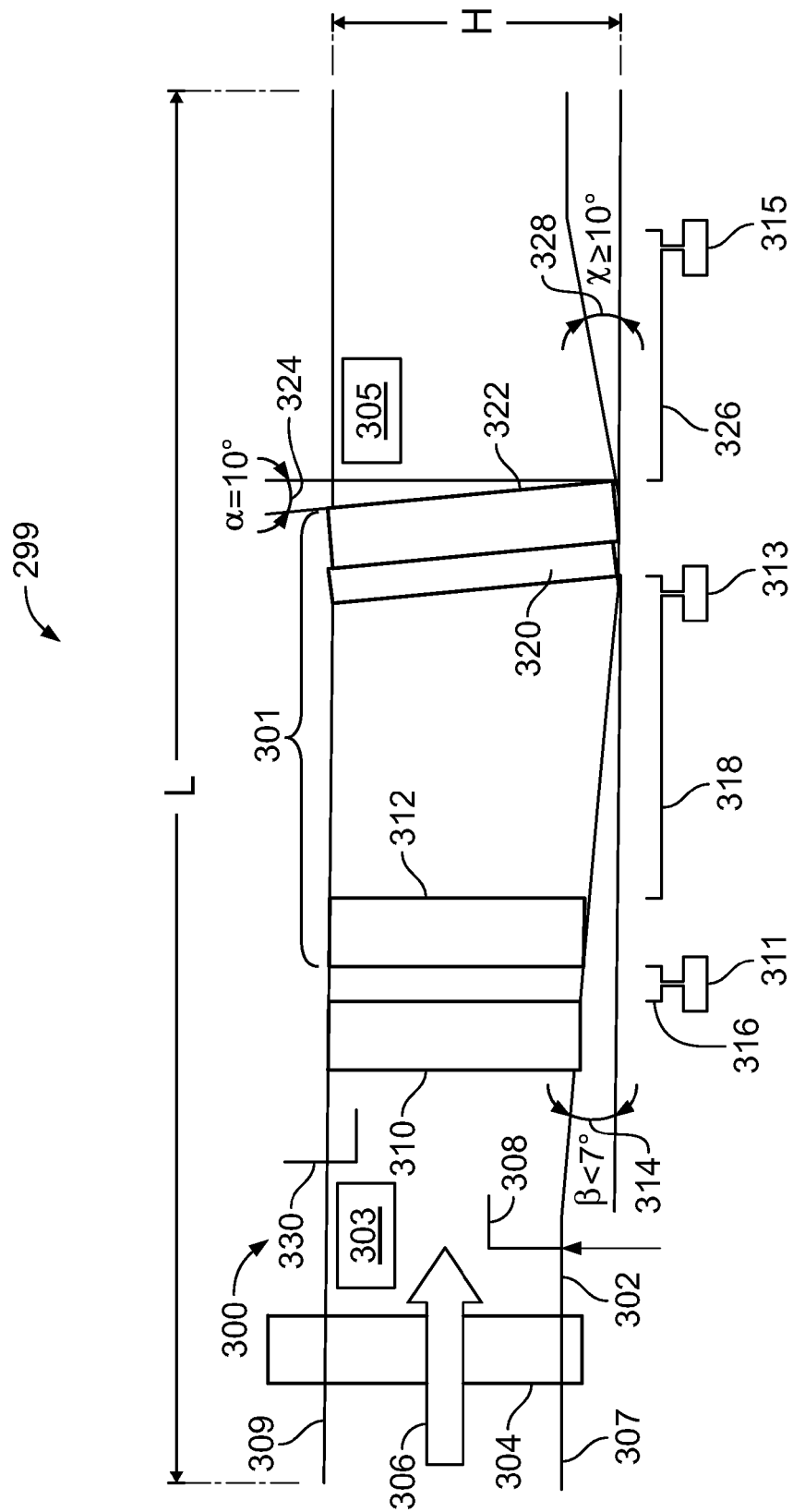
FIG. 3 is a schematic illustration of an exemplary test rig for use in testing a filtration system including the filtration element shown in FIG. 2.

FIG. 3 is a schematic illustration of an exemplary system 299 for testing at least one air filter element. System 299 includes a test rig 300 for testing a candidate static air filtration system for use with gas turbine system 100 (shown in FIG. 1). Test rig 300 includes an elongated duct 302 through which an air flow 306 is channeled. In the exemplary embodiment, a relative humidity of air flow 306 is maintained at an equilibrium condition, such that substantially no evaporation or condensation occurs while tests are performed. Air flow 306 is channeled through a HEPA class air filter element 304, to ensure that air flow 306 is substantially free of materials, other than those intentionally introduced into air flow 306 for test purposes. In the exemplary embodiment, filter element 304 is rated at a higher level of efficiency than an anticipated efficiency of any candidate filter element elements to be tested in rig. 300. System 299 also includes at least one air filter element, which, in the exemplary embodiment, includes a candidate static filtration system 301 that includes a first coalescing filter element 312, a second prefilter element 320, and a final filter element 322.

A salt water spray nozzle 308 is coupled to a source (not shown) of salt water for injection into duct 302. In the exemplary embodiment, nozzle 308 is configured upstream of a large diameter droplet removal vane separator 310 that is upstream from coalescing filter element 312. In the exemplary embodiment, water used to prepare salt water for injection into duct 302 via nozzle 308 is filtered using reverse osmosis (RO). In the exemplary embodiment, salt water for injection into duct 302 via nozzle 308 may have any predetermined concentration, for example about 35 g/l, that enables test rig 300 to function as described herein. Duct 302 includes a first gutter 316 positioned between vane separator 310 and coalescing filter element 312 to collect liquid shed upstream from coalescing filter element 312. Prefilter element 320 and final filter element 322 are oriented in duct 302 downstream from coalescing filter element 312. In the exemplary embodiment, prefilter element 320 and final filter element 322 are provided with an upstream incline 324 that has an angle $\alpha$, wherein a is about 10°. In an alternative embodiment, $\alpha$ is any angle that enables test rig 300 to function as described herein. Duct 302 includes a second gutter 318 positioned between coalescing filter element 312 and prefilter element 320 to collect liquid shed downstream from coalescing filter element 312 in addition to liquid shed upstream from prefilter element 320. Duct 302 includes a third gutter 326 that is downstream from final filter element 322. Liquid collected in each respective gutter 316, 318 and 326 is channeled to a separate respective collection container 311, 313, and 315 for measurement of liquid volume collected and determination of salt quantities intercepted and/or allowed to pass by each filter element 312, 320, and 322. Each collection container 311, 313, and 315 may be maintained under negative pressure, for example by a suction pump, to expedite withdrawal of liquid from gutters 316, 318, and 326 into their respective collection containers 311, 313, and 315. In the exemplary embodiment, duct 302 may have any configuration that enables test rig 300 to function as described herein, provided that duct 302 enables collection of liquids without prompting flow separation upstream of filter element elements being tested.

In the exemplary embodiment, duct 302 includes a downstream-oriented downward incline 314 of angle $\beta$, where $\beta$ is less than about 7°. Downstream from final filter element 322, duct 302 includes a downstream-oriented upward incline 328 of angle $\chi$, where $\chi$ is greater than or equal to about 10°. In an alternative embodiment, each of angles $\beta$ and $\chi$ may have any value that enables test rig 300 to function as described herein. Each candidate filter element 312, 320, and 322 is mounted within duct 302 using production gaskets and support/retention systems (not shown) as provided by the manufacturer of each respective candidate filter element. In addition, each filter element 312, 320, and 322 is compressed within duct 302 in accordance with manufacturer-provided instructions.

Duct 302 includes at least two inspection windows 303 and 305 that are configured respectively upstream and downstream of filter element elements 312, 320 and 322 being tested. In the exemplary embodiment, test rig 300 includes at least one sensor 330 coupled to a measurement device (not shown), for use in detecting at least one characteristic representative of conditions within duct 302 during a test run. For example, sensor 330 may be a pressure sensor for detecting a pressure drop across one or more of filter element elements 312, 320, and/or 322. More particularly, sensor 330 may have any configuration that enables test rig 300 to function as described herein. For example, sensor 330 may include a plurality of measurement devices such as, but is not limited to, a pressure transducer, a humidity sensor, a thermocouple, a flame photometer, a white light spectrometer ("white light counter"), an electrical low pressure impactor, a laser particle size analyzer, and aerodynamic particle sizer, a conductimeter/ion selective electrode ("ISE") device, and/or a "smart" pressure transmitter. In an embodiment, test rig 300 may include any number and type of sensors that enables test rig 300 to function as described herein.

Figure 4:
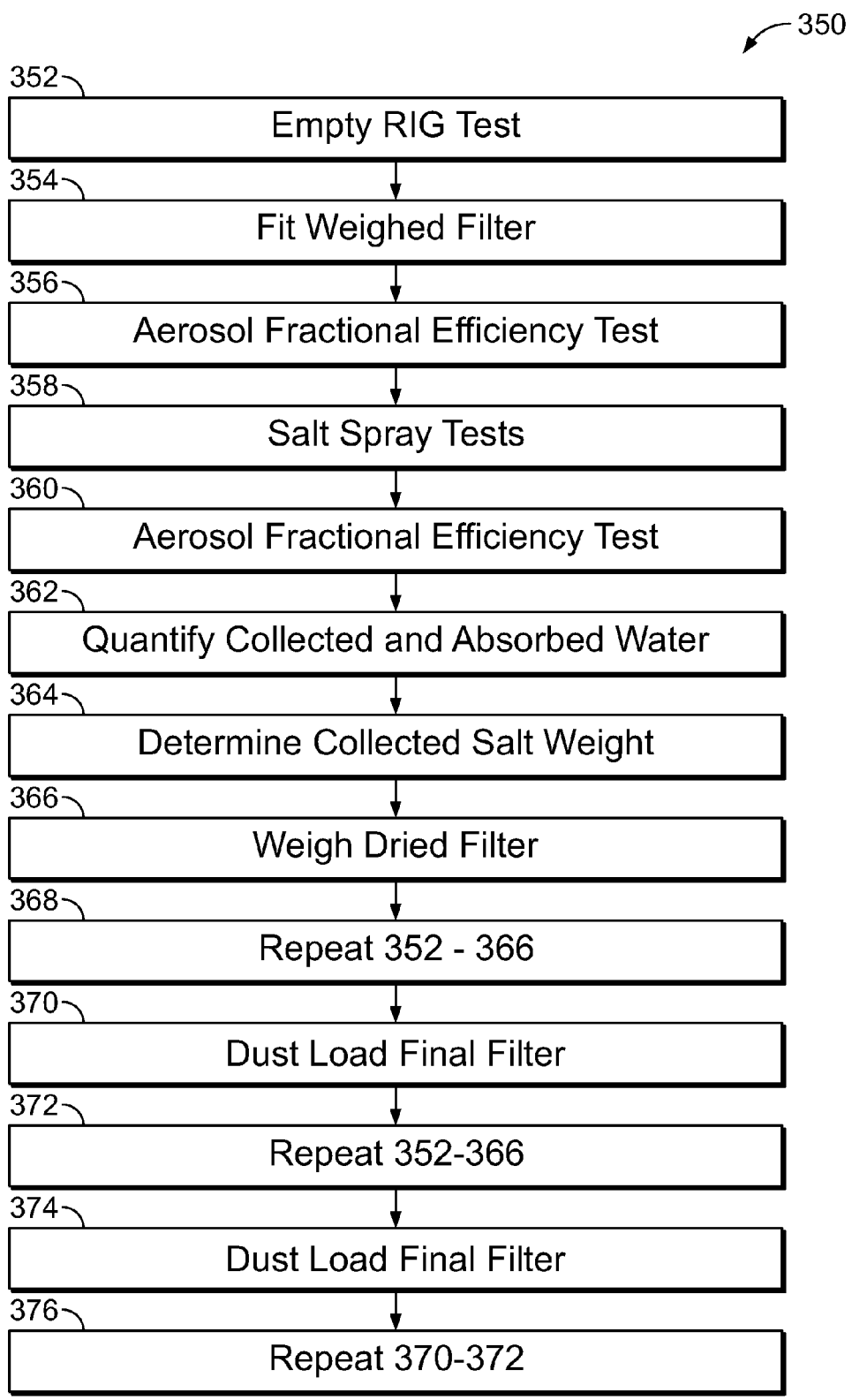
FIG. 4 is a flow chart of an exemplary test procedure for testing a filtration system including the filtration element shown in FIG. 2.

FIG. 4 is a flow chart illustrating an exemplary test method 350 for testing a static filtration system. Prior to each test run, test rig 300, including nozzle 308, sensor 330, and all other components, are thoroughly washed and rinsed to ensure that all surfaces are clean and substantially free of salt residue or other materials that might affect test results. Test method 350 is initiated by performing an empty rig test 352 (also referred to as "calibration") in which rig 300 is operated without filter element elements 312, 320 and 322, and with air flow 306 at 100% of a predetermined test air flow rate. As described above, in the exemplary embodiment, test rig 300 includes a white light spectrometer and a flame photometer (not shown) that may be oriented within test rig 300 in any manner that enables test rig 300 to function as described herein. An aerosol spray is injected into air flow 306. Test rig 300 is run without filter element elements 312, 320, and 322 to enable calibration of the white light spectrometer and flame photometer. Empty rig test 352 is performed for a predetermined period of time. Measurements taken and recorded may include, but are not limited to, spray droplet size and spray density. After completion of empty rig test, air flow 306 and the aerosol spray are shut off, and duct 302 is cleaned.

After empty rig test 352 is completed, installation 354 of candidate filter element elements 312, 320, and 322 is performed. Specifically, new unused filter element elements 312, 320, and 322 are weighed and fitted into duct 302. More particularly, in the exemplary embodiment, filter element elements 312, 320, and 322 are installed in rig 300, using installation procedures specified by the respective manufacturers of the filter element elements, rather than using more robust coupling devices (not shown) used in known test rigs. Upstream filter element flanges (not shown) on filter element elements 312, 320, and 322 are sealed to prevent bypass of water, except through filter element elements 312, 320, and 322, and their corresponding gaskets. After filter element elements 312, 320, and 322 are fitted 354 into duct 302, an aerosol fractional efficiency test 356 is performed. One example of a standardized fractional efficiency test that may be used during test method 350 is referred to as an EN779 fractional efficiency test. This test is only exemplary, and the methods and systems described herein are not limited thereto. In the exemplary embodiment, air flow 306 is initiated at a predetermined flow rate. After air flow 306 has stabilized, the aerosol spray is restarted, and the fractional efficiency test 356 is performed using the white light particle counter, and the results are recorded.

After fractional efficiency test 356 is completed, a series of salt spray tests 358 are performed. More specifically, salt water is injected via nozzle 308 into air flow 306 for a recording period having a first predetermined duration. Each recording period includes a plurality of discrete test sessions each having a second predetermined duration that is shorter than the first predetermined duration, during which measurements are taken and recorded. The discrete test sessions are separated by intervals of time having a third predetermined duration, during which measurements are not taken and/or not recorded.

During each recording period, and more particularly, during each recording session, measurements are taken of various conditions within test rig 300, which may include but are not limited to air flow rate, salt water flow rate, static air pressure upstream and downstream of candidate filtration system 301, airborne salt concentration upstream and downstream of candidate filtration system 301, airborne water quantity upstream and downstream of candidate filtration system 301. For example, while salt water is injected via nozzle 308 differential pressure drops ("Dp") across each filter element 312, 320, and 322 are monitored, for example, via sensor 330 (shown in FIG. 3), which may be a Dp measurement nozzle. Sensor 330 may be oriented at any location along a height H or a length L of duct 302 that enables test method 350 to be performed as described herein.

In the exemplary embodiment, each test session may be about 15 minutes, and each interval between test sessions may be about 15 to 20 minutes, such that each recording session has a length of between about one to about one and one-half hours. In an alternative embodiment, the test sessions and the recording periods may have any length that enables test method 350 to be performed as described. In the exemplary embodiment, after each test session within a single recording period, sensor 330 is moved vertically to a different position within duct 302. For example, during a first test session, sensor 330 is located about mid-way along height H. During a second test session, sensor 330 is moved to a location near a bottom 307 or a top 309 of duct 302. In the exemplary embodiment, sensor 330 is moved in a continuously repeating sequence of locations within duct 302.

In the exemplary embodiment, after an initial series of salt spray tests 358 is performed within a single recording period, salt spray testing 358 is repeated for at least two more recording sessions. Following completion of salt spray testing 358, another aerosol fractional efficiency test 360 is performed, as described hereinabove. After aerosol fractional efficiency test 360 is completed, a liquid measurement 362 is performed, during which water collected, via gutters 316, 318, and 326, in respective collection containers 311, 313, and 315 is quantified, and filter element elements 312, 320, and 322 are weighed. In addition, a salt concentration of the liquid in each of containers 311, 313, and 315 is also determined, using any suitable procedure. After liquid measurement 362 is performed, a weight of dry salt remaining in duct 302 and on filter element elements 312, 320, and 322 is determined 364. Dry salt weight determination 364 is accomplished by rinsing duct 302 364 with a predetermined quantity of RO water. The rinsate is collected in the collection containers 311, 313, and 315 coupled to each gutter 316, 318, and 326. The rinsate is weighed and a salt concentration measurement is performed to determine 364 an equivalent dry salt weight. After the dry salt weight determination 364 is completed, a dry filter element weight for filter element elements 312, 320, and 322 are determined 366. Filter element elements 312, 320, and 322 are returned to duct 302 and dried 366 by initiating an air flow 306 at a predetermined flow rate while relative humidity within duct 302 is maintained at an equilibrium state, such that substantially no evaporation or condensation occurs during a test procedure. After drying, the weights of filter element elements 312, 320 and 322 are recorded.

In the exemplary embodiment, procedures 352 to 366 are repeated on the same filter element 368 for a predetermined number of repetitions, for example, until procedures 352 to 366 have been performed a total of five iterations. In an alternative embodiment, procedures 352 to 366 may be repeated any number of times that enables test method 350 to function as described herein.

After procedures 352 to 366 have been repeated 368, a dust loading procedure 370 is performed. Vane separator 310, coalescing filter element 312, and prefilter element 320 are removed from test rig 300. In the exemplary embodiment, final filter element 322 is loaded with ASHRAE dust to a predetermined pressure, for example 450 Pa. In an alternative embodiment, any test dust material may be used, under any suitable conditions that enable test method 350 to be performed and function as described herein. After dust loading 370, procedures 352 to 366 are performed for two iterations 372. Dust loading 374 is performed again, as previously described. After dust loading 374, procedures 352 to 366 are repeated 376 for two iterations. Test results, including measurements taken during each series of procedures 352-374, may be presented in table and/or graph form. The use of test method 350 facilitates the qualification of an entire air filtration system, including a coalescing filter element 312, a prefilter element 320 and a final filter element 320. By enabling the qualification of an entire filtration system 301, test method 350 enables a filter element system change-out to be performed instead of a complete inlet tear-down, resulting in substantially reduced maintenance costs associated with a gas turbine engine system 100 (shown in FIG. 1).

In the exemplary embodiment, test method 350 may require several days for completion, during which a candidate static filtration system 301 is exposed to conditions simulating those to which a filtration system 301 located in a coastal environment may be exposed. Once a "model" filtration system 301 is identified, that exhibits, for example, acceptable performance characteristics under actual service conditions, such a "model" filtration system 301 may be tested in test rig 300, using test method 350. Test results thus obtained may be adopted as a standard, against which future candidate filtration systems 301 may be compared.

FIG. 5 is a perspective view of an exemplary self-cleaning filter element 380 for use with a gas turbine system 100 (shown in FIG. 1). The self-cleaning filter may be a filter pair, as shown in FIG. 5, or one or more filter elements. As used herein, "self-cleaning" refers to an air filter element configured to be at least partially restored to a usable condition, after having been at least partially filled with water, salt, and/or debris, for example through a series of high-frequency air pressure pulses. More particularly, filter element 380 is a water-tight self-cleaning filter element. In the exemplary embodiment, filter element 380 includes an outer tube or frame 382 that supports a filter element medium 384. In the exemplary embodiment, each of tube/frame 382 and filter element medium 384 may have any suitable configuration and may be fabricated from any suitable material that enables filter element 380 to function as described herein. In use, filter element 380 is coupled to a support structure (not shown), such that a first end 385 is oriented toward an intake air flow 105 (also shown in FIG. 1), wherein air flow 105 is channeled in a direction parallel to an axis 381 of filter element 380. A second end 387 is oriented against the support structure. When filter element 380 is tested, as described in further detail hereinbelow, filter element 380 may be configured in any orientation relative to an air flow 105.

FIG. 6 is a schematic illustration of a system 399 for testing at least one air filter element. System 399 includes an exemplary test rig 400. In the exemplary embodiment, system 399 also includes at least a candidate self-cleaning air filter element 410, wherein filter element 410 is similar to filter element 380 (shown in FIG. 5), and includes a longitudinal axis 405. Test rig 400 includes an elongated duct 402 through which an air flow 406 is channeled. Air flow 406 is channeled through a HEPA class air filter element 404, to ensure that air flow 406 is substantially free of materials, other than those intentionally introduced into air flow 406 for test purposes. In the exemplary embodiment, filter element 404 is rated at a higher level of efficiency than filter element elements to be tested in rig 400. In addition, a relative humidity of air flow 406 is maintained in an equilibrium condition, such that substantially no evaporation or condensation occurs during a test procedure. In the exemplary embodiment, air filter element 410 is configured within rig 400 such that axis 405 is parallel to air flow 406. In an alternative embodiment, air filter element 410 may be configured in any orientation that enables the test methods described herein to be performed. For example, in an alternative embodiment (not shown), air filter element 410 may be configured in rig 400 such that axis 405 is perpendicular to air flow 406.

In the exemplary embodiment, system 399 includes air filter element 410 as a stand-alone component. In an alternative embodiment, air filter element 410 may be accompanied by additional filter elements (not shown in FIG. 6), such as, but not limited to, a coalescing filter element similar to coalescing filter element 312, and/or prefilter element 320 (both shown in FIG. 3). Accordingly, system 399 may include any number and type of air filter elements that enables system 399 to function as described herein.

A salt water spray nozzle 408 is coupled to a source (not shown) of salt water for injection into duct 402 upstream of filter element 410. Filter element 410 is coupled to a support 418. Salt water to be supplied to nozzle 408 may be prepared in a manner similar to that in which salt water is prepared for use in test method 350 (shown in FIG. 4). A first gutter 414 oriented upstream of support 418 collects liquid runoff from filter element 410. A second gutter 416 downstream of support 418 collects liquids that pass through filter element 410 and coalesce downstream of filter element 410. Each gutter 414 and 416 is coupled to a separate respective collection container 415 and 417 to enable liquid collected at each gutter to be separately measured. In addition, each collection container 415 and 417 is maintained under a negative pressure, for example, by a pump, to facilitate collection of shed liquids. In the exemplary embodiment, duct 402 includes a downstream-oriented downward incline 412 of angle $\beta$, where $\beta$ is less than about 7°. Downstream from filter element 410, duct 402 includes a downstream-oriented upward incline 420 of angle $\chi$, where $\chi$ is greater than or equal to about 10°. In an alternative embodiment, each of angles $\beta$ and $\chi$ may have any value that enables test rig 400 to function as described herein. Each filter element 410 is mounted within duct 402 using production gaskets and/or support/retention systems (not shown) as provided by the manufacturer of each respective filter element. In addition, filter element 410 is mounted within duct 402 in accordance with manufacturer-provided instructions.

Duct 402 includes at least two inspection windows 403 and 407 that are configured respectively upstream and downstream from filter element In the exemplary embodiment, test rig 400 includes at least one sensor 430 coupled to a measurement device (not shown), for use in detecting at least one characteristic representative of conditions within duct 402 during a test run. For example, sensor 430 may be a pressure sensor for detecting a pressure drop across filter element 410. More particularly, sensor 430 may have any configuration that enables test rig 400 to function as described herein. For example, sensor 430 may include a plurality of measurement devices such as, but not limited to, a pressure transducer, a humidity sensor, a thermocouple, a flame photometer, a white light spectrometer, an electrical low pressure impactor, a laser particle size analyzer, and aerodynamic particle sizer, a conductimeter/ISE instrument, and/or a "smart" pressure transmitter. In an embodiment, test rig 400 may include any number and type of sensors that enables test rig 400 to function as described herein. Sensor 430 may be oriented at any location along a height N or a length M of duct 402 that enables test method 500 to be performed as described herein.

Figure 7:
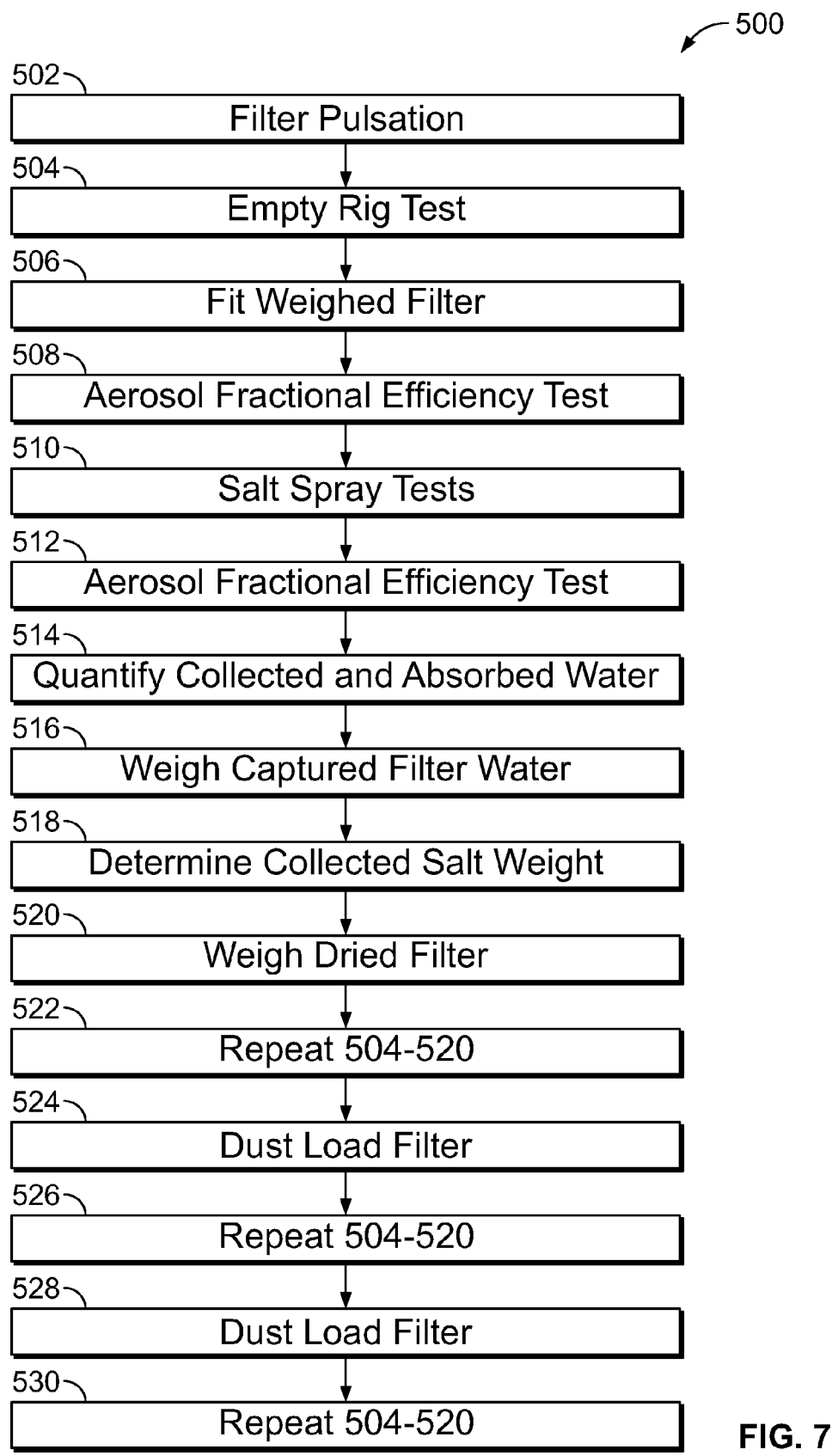
FIG. 7 is a flow chart of an exemplary test procedure for testing the filtration element shown in FIG. 5.

FIG. 7 is a flow chart illustrating an exemplary test method 500 for testing a candidate self-cleaning filter element 410 (shown in FIG. 6). Test method 500 is initiated by pulsation 502 of candidate filter element 410 with air pulses having a predetermined pressure, for a predetermined number of cycles, for example between about 10,000 cycles to about 72,000 cycles. The number of cycles may be selected to represent an exemplary number of cycles that a candidate filter element 410 may be expected to experience during a predetermined desired service life. More particularly, pulsation may damage or destroy membranes and/or coatings (not shown) used to make filter element 410 watertight. Accordingly, the use of pulsations simulates pulsations experienced by a filter element 410 when in service, so that a standard number of pulsations may be established against which candidate filter element elements 410 may be tested. In an alternative embodiment, pulsation pressure and number of cycles may have any value that enables test procedure to function as described herein.

In the exemplary embodiment, test method 500 is performed on a self-cleaning filter element 410 (shown in FIG. 6). In an alternative embodiment, a static filter element (not shown in FIG. 6) may be tested. In that alternative embodiment, pulsation 502 is omitted from method 500.

In test method 500, procedures such as aerosol efficiency tests and salt spray tests, are performed in a manner substantially similar to aerosol efficiency tests and/or salt spray tests performed during test method 350 (shown in FIG. 4). After pulsation 502, an empty rig test 504 is performed, followed by installation 506 of a new unused candidate filter element 410. An aerosol efficiency test 508, similar to aerosol efficiency test 356 (shown in FIG. 4), is performed. After efficiency test 508, a series of salt spray tests 510 are performed. In the exemplary embodiment, after each test session within a single recording period, sensor 430 is moved vertically to a different position within duct 402. For example, during a first test session, sensor 430 is located about mid-way along height N. During a second test session, sensor 430 is moved to a location near a bottom or a top of duct 402. In the exemplary embodiment, sensor 430 is moved in a continuously repeating sequence of locations within duct 402. After salt spray tests 510 are completed, another aerosol efficiency test 512 is performed.

After aerosol efficiency test 512, a liquid measurement 514 is performed, during which water collected in the collection containers 415 and 417 associated with each respective gutter 414 and 416 is quantified. Filter element 410 is also weighed together with any water retained in it. Next, the water retained in filter element 410 is drained, using any suitable method, and the previously retained water and filter element 410 are separately weighed 516. Duct 402 is rinsed, and the rinsate is collected and measured to determine 518 an equivalent dry salt weigh that represents the amount of salt remaining on surfaces within test rig 400. Filter element 410 is dried and weighed 520, in the same manner that filtration system 301 was weighed during procedure 366. Procedures 504 to 520 are repeated 522 using the same filter element. In the exemplary embodiment, a total of five iterations 522 of procedures 504 to 520 are performed. In an alternative embodiment, any number of iterations 522 of procedures 504 to 520 may be performed.

Filter element 410 is dust loaded 524, and procedures 504 to 520 are repeated 526 for two iterations. Filter element 410 is again dust loaded 528, and procedures 504 to 520 are repeated 530 for two iterations. Test results, including measurements taken during each series of procedures 504-520, may be presented in table and/or graph form.

In the exemplary embodiment, test method 500 may require several days for completion, during which time, a candidate self-cleaning filter element 410 is exposed to conditions simulating those to which a self-cleaning filter element 410 located in a coastal environment may be exposed. Once a "model" filter element 410 is identified that exhibits, for example, acceptable performance characteristics under actual service conditions, such a "model" filter element 410 may be tested in test rig 400 using test method 500. Test results thus obtained may be adopted as a standard, against which future candidate filter element elements 410 may be compared. Test method 500 enables the qualification of a water-tight self-cleaning air filter element 410. Results from performing test method 500 on an air filter element 410 may also be compared to a model test result for a static air filtration system (shown in FIG. 3), as described hereinabove, for purposes of qualifying a candidate self-cleaning air filter element.

The methods and systems described herein simulate a variety of tasks or capabilities that may be expected of a candidate filtration system 301, including but not limited to: 1) new filter element clean water removal; 2) saturated filter element water removal; 3) performance during repeated wet and dry cycles to determine migration of salt through filtration system 301; 4) filtration efficiency during wet and dry cycles; 5) pressure loss during wet cycles; 6) dirty water removal as simulated via dust loading; and 7) salt removal performance degradation due to self-cleaning. The methods and systems described herein address a procedure for testing filtration systems, including but not limited to, static air filtration systems that include a series of separate static air filter element elements, and air filtration systems that include a stand-alone self-cleaning filter element. The methods and systems described herein address a test procedure that simulates at least some conditions that a filtration system located in a coastal environment may experience. In addition, the methods and systems described herein facilitate the testing of a candidate filtration system or filter element to qualify performance of a candidate filter element (self-cleaning or static filter element) against a simulated coastal environment. The methods and systems described herein enable the salt removal capabilities of a candidate filter element to be determined by comparison to an air filtration system configuration that has demonstrated predetermined levels of salt removal deemed to be acceptable in costal environments. The methods and systems described herein also address water and salt breakthrough characteristics of a candidate filter element.

The disclosure described herein provides several advantages over known systems and methods for testing air filtration elements for use in gas turbine systems. Specifically, the systems and methods described herein facilitate testing a filtration system that uses static air filtration elements as a whole, rather than testing individual filtration elements, and/or self-cleaning filter element elements, specifically under conditions simulating those to which a static air filtration system located in a coastal environment may be exposed. The systems and methods described herein additionally provide for testing of filtration elements under as-installed conditions, rather than using generic test rig equipment and configurations.

Exemplary embodiments of air filtration system and filter element test rigs and test procedures are described above in detail. The systems and methods are not limited to the specific embodiments described herein, but rather, actions of the methods and/or components of the systems may be utilized independently and separately from other components and/or actions described herein. For example, the systems and methods described herein are not limited to practice only with filter element elements for use in gas turbine engine systems, but also may be used in combination with air filter element elements for use in other devices that incorporate air filter element elements that intake and filter element outdoor ambient intake air.

The systems and methods are not limited to the specific embodiments described herein, but rather, operations of the methods and/or components of the systems may be utilized independently and separately from other components and/or actions described herein. The method operations described herein are just examples. There may be many variations to the operations described therein without departing from the spirit of the disclosure. For instance, except as specifically described, the actions may be performed in a differing order, or actions may be added, deleted or modified. All of these variations are considered a part of the claimed subject matter.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems and methods described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure may be practiced with modification within the spirit and scope of the claims.

What is claimed is:

1. A method for testing at least one air filter element, said method comprising:
   providing a test rig, wherein the test rig includes an elongated duct that has a bottom wall and a top wall, and at least one measurement device coupled to the duct, wherein the at least one measurement device is configured to measure at least one characteristic representative of a condition within the duct;
   coupling at least one air filter element within the test rig;
   performing at least one first salt spray test on the at least one air filter element;
   measuring at least one of an amount of salt spray water and an equivalent amount of dry salt remaining in the test rig;
   performing at least one second salt spray test on the at least one air filter element, wherein the at least one air filter element is dust loaded prior to the at least one second salt spray test.

2. A method in accordance with claim 1, wherein performing at least one first salt spray test comprises:
   initiating an air flow through the duct; and
   injecting a salt water spray into the duct upstream from the at least one air filter element.

3. A method in accordance with claim 1, wherein performing at least one first salt spray test comprises:
   performing the at least one first salt spray test during a recording period having a first predetermined duration; and
   recording at least one measurement during each of a plurality of discrete test sessions during the recording period, wherein each test session has a second predetermined duration less than the first predetermined duration, and wherein successive test sessions are separated by an interval having a third predetermined duration, during which interval measurements are not recorded.

4. A method in accordance with claim 3, wherein performing at least one first salt spray test comprises repositioning the at least one measurement device after each discrete test session.

5. A method in accordance with claim 3, wherein performing at least one first salt spray test further comprises repeating the at least one first salt spray test for a total of at least three iterations.

6. A method in accordance with claim 1, wherein coupling at least one air filter element within the test rig comprises coupling a static air filtration system within the test rig, wherein the static air filtration system includes at least two filter elements.

7. A method in accordance with claim 1, wherein coupling at least one air filter element within the test rig comprises coupling a self-cleaning filter element within the test rig.

8. A method in accordance with claim 1, wherein said method further comprises performing an empty rig test, prior to coupling the at least one air filter element within the test rig, to calibrate the at least one measurement device.

9. A method in accordance with claim 1, wherein said method further comprises performing at least one aerosol fractional efficiency test, wherein the at least one aerosol fractional efficiency test is performed at least one of prior to performing the at least one first salt spray test and subsequent to performing the at least one first salt spray test.

10. A method in accordance with claim 1, wherein coupling at least one air filter element within the test rig further comprises coupling the at least one air filter element using a procedure determined by a provider of the at least one air filter element.

11. A method in accordance with claim 1, wherein measuring at least one of an amount of salt spray water and an equivalent amount of dry salt remaining in the test rig comprises:
    collecting salt spray water in at least one collection container configured at least one of upstream from and downstream from the at least one air filter element;
    weighing the collected salt spray water; and
    weighing the at least one air filter element including water retained in the at least one air filter element.

12. A method in accordance with claim 11, wherein measuring at least one of an amount of salt spray water and an equivalent amount of dry salt remaining in the test rig comprises:
    after collection of the salt spray water, rinsing the test rig with a predetermined quantity of filtered rinse water;
    collecting a rinsate; and
    performing a salt concentration measurement on the collected rinsate.

13. A method in accordance with claim 1, wherein said method further comprises:
    drying the at least one filter element after measuring at least one of an amount of salt spray water and an equivalent amount of dry salt remaining in the test rig.

14. A method in accordance with claim 13, wherein said method further comprises performing the at least one first salt spray test, and measuring at least one of an amount of salt spray water and an equivalent amount of dry salt for a predetermined number of iterations prior to performing the at least one second salt spray test with a dust loaded at least one air filter element.

15. A method in accordance with claim 1, wherein said method further comprises pulsating the at least one air filter element prior to coupling the at least one air filter element to the test rig.

* * * * *